(12) United States Patent
Fukuda et al.

(10) Patent No.: US 6,328,478 B1
(45) Date of Patent: Dec. 11, 2001

(54) ROLLER BEARING FOR BEARING UNIT

(75) Inventors: Shinji Fukuda, Osaka; Shizuaki Hashimoto, Tokyo, both of (JP)

(73) Assignees: Koyo Seiko Co., Ltd., Osaka; Mitsui Seiki Kogyo Co., Ltd., Tokyo, both of (JP)

( * ) Notice: Subject to any disclaimer, the term of this patent is extended or adjusted under 35 U.S.C. 154(b) by 0 days.

(21) Appl. No.: 09/581,434

(22) PCT Filed: Dec. 16, 1998

(86) PCT No.: PCT/JP98/05673
§ 371 Date: Jun. 13, 2000
§ 102(e) Date: Jun. 13, 2000

(87) PCT Pub. No.: WO99/31399
PCT Pub. Date: Jun. 24, 1999

(30) Foreign Application Priority Data

Dec. 16, 1997 (JP) .................................................. 9-346592

(51) Int. Cl.⁷ .................................................. F16C 33/66
(52) U.S. Cl. .................................................. 384/475
(58) Field of Search .................................... 384/462, 465, 384/466, 467, 468, 473, 474, 475

(56) References Cited

U.S. PATENT DOCUMENTS

| | | | | |
|---|---|---|---|---|
| 2,217,801 | * | 10/1940 | Katcher | 384/475 |
| 4,108,506 | * | 8/1978 | Osborn | 384/471 |
| 4,129,344 | * | 12/1978 | Hormann et al. | 384/467 |
| 4,334,720 | * | 6/1982 | Signer | 384/475 |
| 4,384,749 | * | 5/1983 | Schaefer | 384/465 |
| 4,797,014 | * | 1/1989 | Nicolich | 384/475 X |
| 5,320,433 | * | 6/1994 | Kimata et al. | 384/473 |
| 5,399,027 | * | 3/1995 | Ijuin et al. | 384/475 |
| 5,749,660 | * | 5/1998 | Dusserre-Telmon et al. | 384/475 |

FOREIGN PATENT DOCUMENTS

| | | | |
|---|---|---|---|
| 48-8850 | 7/1973 | (JP) . | |
| 3144117 | * 6/1991 | (JP) | 384/475 |
| 5-30559 | 4/1993 | (JP) . | |
| 6-37624 | 5/1994 | (JP) . | |
| 6-235425 | 8/1994 | (JP) . | |
| 6264934 | * 9/1994 | (JP) | 384/475 |

* cited by examiner

Primary Examiner—Thomas R. Hannon
(74) Attorney, Agent, or Firm—Rabin & Berdo, P.C.

(57) ABSTRACT

A rolling bearing for a bearing unit is applicable to so-called under-race lubrication employing an oil air method or an oil mist method. A lubrication oil is supplied toward rolling elements (10) through oil supply channels (21) from a bottom (18) of an annular groove (14) formed in one end face (13) of an inner ring (5). A V-shaped groove (20) is provided along an edge of a raceway groove (8) of the inner ring (5) circumferentially of the inner ring. Outlet ports (25) of the oil supply channels (21) are provided in a recess defined by one of inclined surfaces of the V-shaped groove (20). A space (S) is defined between the outlet ports (25) and the rolling elements (10). A sufficient amount of air flows through the space (S), whereby the lubrication oil is supplied to the rolling elements (10) and the raceway groove (8).

9 Claims, 5 Drawing Sheets

ROLLER BEARING FOR BEARING UNIT

TECHNICAL FIELD

The present invention relates to a rolling bearing for a bearing unit which is adapted to be forcibly lubricated with a lubrication oil.

BACKGROUND ART

In a rolling bearing such as to be used to support a machine tool spindle or the like in high speed rotation, a lubrication oil is jetted or sprayed into a space between an inner ring and an outer ring for lubrication of the inside of the bearing.

In the high speed rotation of the spindle, the lubrication oil should assuredly be supplied to the inside of the bearing against a centrifugal force and a high-speed air flow occurring adjacent an end face of the bearing due to rotation of rolling elements and a retainer. Therefore, a problem has been arisen with lubrication of the inside of the bearing, particularly, lubrication of a raceway groove of the inner ring which is prone to insufficient lubrication.

For the lubrication of the inside of the bearing, various under-race lubrication methods have been known, in which the lubrication oil is jetted toward the rolling elements from an oil supply channel having an orifice in the inner ring raceway groove formed on the inner ring.

One exemplary under-race lubrication method is disclosed in Japanese Unexamined Patent Publication No. 6-235425 (1994) which proposes an angular bearing apparatus, wherein a lubrication oil jetted from a nozzle or the like is retained in an annular space formed in an inner ring spacer and jetted toward rolling elements from the annular space through an oil supply channel formed in the inner ring spacer.

In the apparatus disclosed in this publication, an outlet port of the oil supply channel formed in the inner ring spacer is located as close to the rolling elements as possible. In this respect, the spacer has a relatively great axial size and the inner ring has a much smaller axial size than an outer ring, so that the inner ring spacer is inserted radially inwardly of the outer ring. However, this arrangement suffers from the following drawbacks (1) to (4):

(1) Since a mechanism defining the annular space is provided in a member separate from the inner ring, the bearing apparatus has a complicated construction and a greater size.

(2) If there is a great axial size difference between the inner ring and the outer ring, it is difficult to control the axial size difference (so-called stand-out). In a conventional case where the stand-out corresponds to a pre-load, it is merely necessary to place the inner ring and the outer ring on a surface plate and to determine a height difference between the inner and outer rings with inner end faces of the inner and outer rings being defined as a reference surface. In the case of the apparatus disclosed in the aforesaid publication, however, it is necessary to even up the heights of the inner and outer rings by placing the inner and outer rings on a stepped jig placed on a surface plate and to determine a height difference between the inner and outer rings with the inner end faces of the inner and outer rings being defined as a reference surface or with outer end faces of the respective rings being defined as a reference surface. This approach is troublesome.

(3) Since the inner ring having a smaller axial size suffers from greater expansive deformation due to a centrifugal force, the engagement between the spindle and the bearing apparatus is loosened, resulting in easy occurrence of creep and the like. Further, the inner ring having a smaller axial size is liable to be inclined with respect to the spindle, resulting in a tendency toward a greater degree of misalignment.

(4) Since the inner ring spacer has a greater axial size and an end portion thereof adjacent to the inner ring has a greater wall thickness to be formed with an annular groove, the end portion of the inner ring spacer is particularly prone to expansive deformation due to a centrifugal force. The expansive deformation of the end portion of the inner ring spacer causes a change in the axial size of the inner ring spacer, resulting in variations in the pre-load.

One approach to these problems is disclosed, for example, in Japanese Utility Model Publication No. 6-37624 (1994), which proposes a rolling bearing unit which is adapted to simultaneously achieve the cooling and lubrication of a bearing and includes an annular groove formed in one end face of an inner ring for retaining therein a lubrication oil jetted from a nozzle, a plurality of through-holes extending through the bottom of the annular groove axially of the inner ring for cooling, and an oil supply channel for communication between a midportion of one of the through-holes and an orifice of the one through-hole located on the side of an inner ring raceway groove for lubrication.

In the rolling bearing unit disclosed in the Japanese Utility Model Publication No. 6-37624, however, the cooling through-holes each have a relatively large diameter to allow for passage of a great amount of the oil for cooling and, hence, have a smaller flow resistance. On the other hand, the oil supply channel branched from the midportion of the one cooling through-hole for the lubrication has a great flow resistance because the orifice thereof on the side of the inner ring raceway groove is narrowed due to presence of a rolling element. Therefore, virtually no lubrication oil flows into the oil supply channel.

Further, where the inner ring is formed with the annular groove, there is generally an area difference between the one end face of the inner ring formed with the annular groove and the other end face of the inner ring not formed with the annular groove. If the opposite end faces of the inner ring having different areas are to be simultaneously polished, the end face having a greater area (not formed with the annular groove) tends to be insufficiently polished due to an insufficient polishing allowance, so that the insufficiently polished end face needs to be subjected again to the polishing process. This leads to a reduction in working efficiency with an additional expense in time and labor. If the opposite end faces of the inner ring are to be separately polished, a similar problem arises without any additional means for applying different axial pressures to the inner ring at the polishing of the respective end faces.

In recent years, an oil mist method and an oil air method have often been utilized for the supply of the lubrication oil for the aforesaid under-race lubrication. The oil mist method is to spray the lubrication oil, while the oil air method is to jet a small amount of the lubrication oil together with air at predetermined time intervals.

In these supply methods, the lubrication can be achieved with the use of a relatively small amount of the lubrication oil, and the use of a smaller amount of the lubrication oil advantageously avoids exertion of an excess inertial load on the spindle. However, the amount of the lubrication oil to be supplied is significantly influenced by the flow of the air, so that stable lubrication is impossible.

More specifically, when a rolling element to be supplied with the lubrication oil passes over the orifice of the oil supply channel in the rolling bearing unit, virtually no space is present between the orifice and the rolling element. Therefore, the air hardly flows through the orifice, thereby failing to spray the oil mist or the oil air directly onto the rolling element. This results in insufficient lubrication.

In view of the foregoing, it is an object of the present invention to provide a rolling bearing unit which is capable of smoothly supplying a lubrication oil to rolling elements for the under-race lubrication employing the oil air method or the oil mist method.

DISCLOSURE OF THE INVENTION

In accordance with a preferred mode of the present invention to achieve the aforesaid object, there is provided a rolling bearing for a bearing unit which is adapted to be forcibly lubricated with a pressurized lubrication oil, the rolling bearing comprising: a fixed outer ring; an inner ring having first and second opposite end faces and rotatable about a center axis of the bearing; a plurality of rolling elements interposed between the outer ring and the inner ring; an annular groove formed in the first end face of the inner ring for retaining therein the pressurized lubricating oil; and a plurality of oil supply channels formed in the inner ring for supplying the lubrication oil toward the rolling elements from the annular groove. The oil supply channels each have an inlet port communicating with the annular groove and an outlet port to be opposed to the rolling elements. The outlet ports of the oil supply channels are located in a recess formed in an outer circumference of the inner ring in a circumferentially equidistantly spaced relation. When the rolling elements pass over the recess, a space is defined between the recess and the rolling elements for releasing the lubrication oil.

This mode allows for stable air flow through the outlet ports, because the space for the release of the lubrication oil is defined between the outlet ports of the oil supply channels and the rolling elements. As a result, the lubrication oil can be supplied in a stable amount toward the rolling elements. Particularly, it is possible to spray oil mist or oil air directly onto the rolling elements passing over the outlet ports, thereby ensuring a very high lubricating efficiency.

Since the lubrication oil is supplied to a raceway groove of the inner ring from the bottom of the annular groove through the oil supply channels for lubrication and the outlet ports of the plurality of oil supply channels are disposed in an equidistantly spaced relation circumferentially of the inner ring, a sufficient amount of the lubrication oil can be supplied evenly over the entire raceway groove of the inner ring.

It is preferred that the outer circumference of the inner ring has a circumferential groove of a V-shaped cross section formed circumferentially thereof and defined by first and second inclined surfaces, and the first inclined surface includes the recess. In this case, working of the inner ring is easy, because the groove is formed along the outer circumference of the inner ring for the provision of the recess as a release portion.

The first inclined surface is preferably opposed to the rolling elements and forms an angle of 85 degrees to 95 degrees with respect to extension axes of the oil supply channels. In this case, the lubrication oil can be sprayed toward the rolling elements with a high directivity. Further, the aforesaid angular range allows for easier drilling for formation of the oil supply channels in the first inclined surface.

BEST MODE FOR CARRYING OUT THE INVENTION

Preferred embodiments of the present invention will be described with reference to the attached drawings.

An explanation will hereinafter be given to an angular ball bearing by way of example. However, it should be understood that the rolling bearing according to the present invention is not limited to the angular ball bearing, and the invention is applicable to a rolling bearing of inner ring rotatable type.

Figure 1:
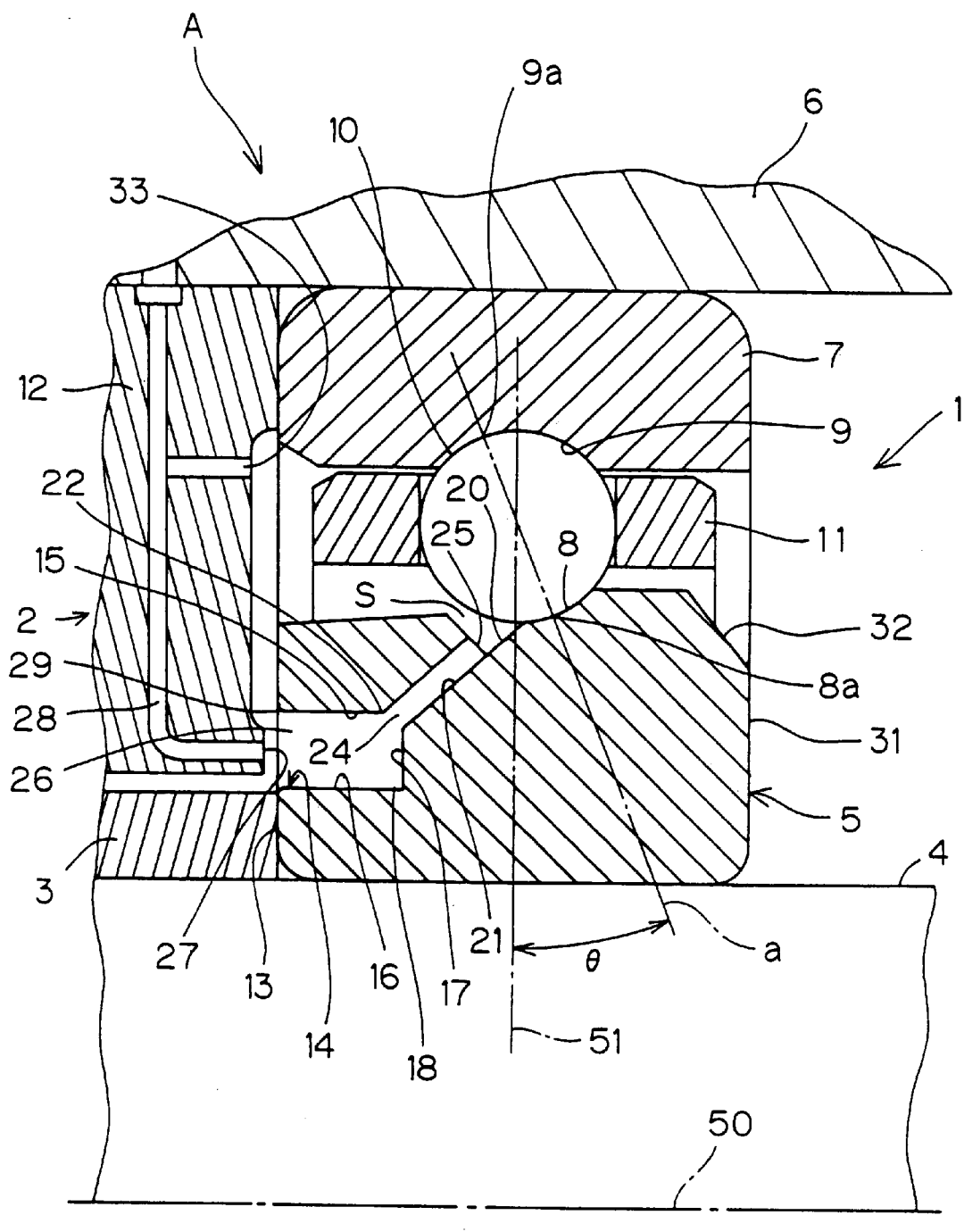
FIG. 1 is a sectional view illustrating major portions of a bearing unit including a rolling bearing in accordance with one embodiment of the present invention.
Figure 2:
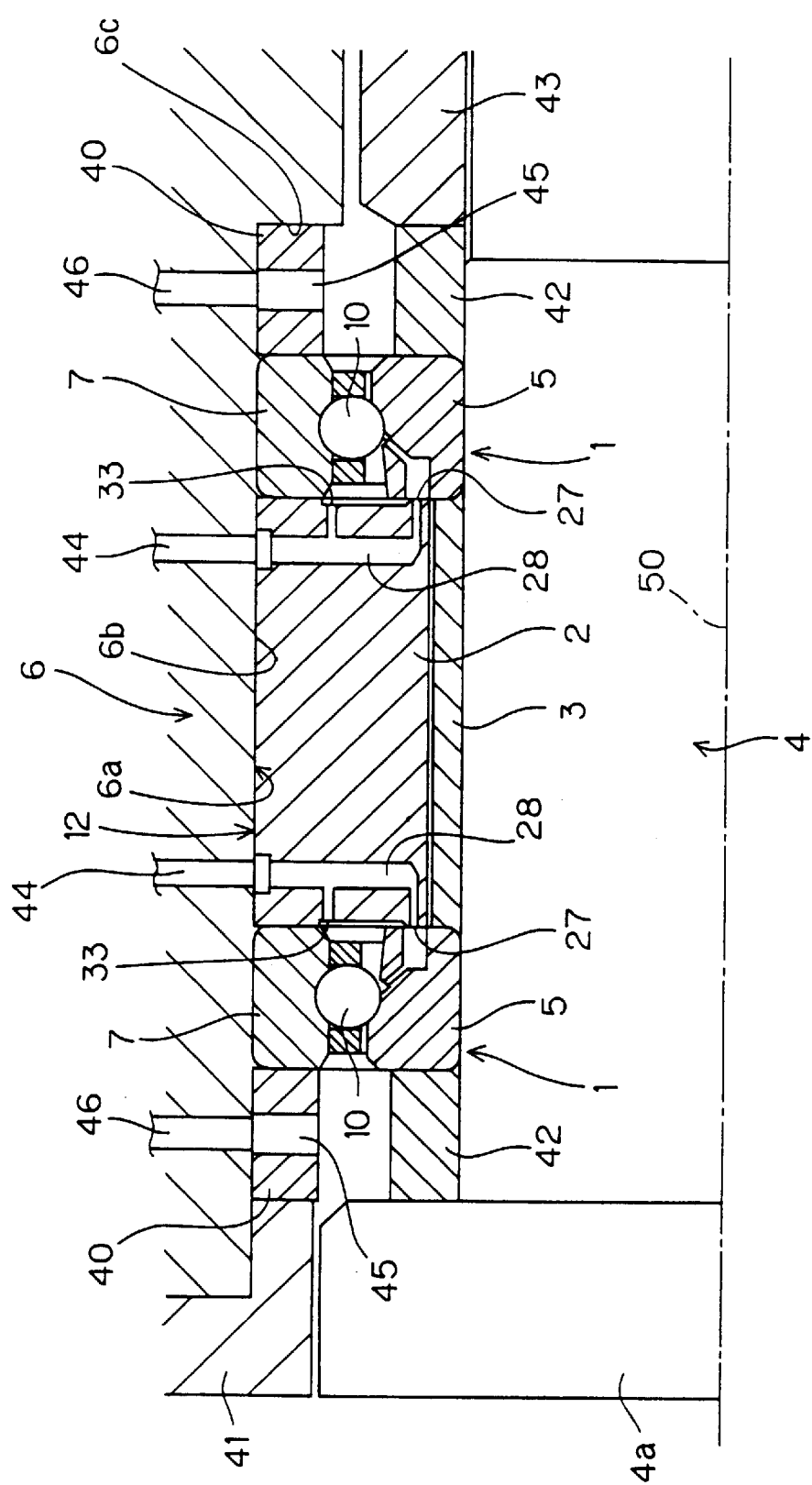
FIG. 2 is a schematic sectional view illustrating the overall bearing unit.

FIG. 2 is a sectional view of a rolling bearing unit according to one embodiment of the present invention, and FIG. 1 is an enlarged view illustrating major portions of the bearing unit shown in FIG. 2. Referring to FIG. 2, the rolling bearing unit A supports a main spindle 4 within a housing 6 thereof. A pair of angular rolling bearings 1, 1 are disposed with their angular contact axes extending in opposite directions. An outer ring spacer 2 is interposed between outer rings 7 and 7 of the angular rolling bearings, and an inner ring spacer 3 is interposed between inner rings 5 and 5 of the angular rolling bearings. A pre-load is determined on the basis of an axial size difference (stand-out) between the inner ring 5 plus the inner ring spacer 3 and the outer ring 7 plus the outer ring spacer 2.

The pair of outer rings 7, 7 holding the outer ring spacer 2 therebetween are held between a pair of spacers 40 and 40. The outer ring spacer 2, the pair of outer rings 7, 7 and the pair of spacers 40, 40 are integrally fixed between a step 6c formed on an inner circumference 6b of a support hole 6a of the housing 6 and a retainer ring 41 fixed to an open end of the support hole 6a by a screw.

The pair of inner rings 5, 5 holding the inner ring spacer 3 therebetween are held between a pair of spacers 42 and 42. The inner ring spacer 3, the pair of inner rings 5, 5 and the pair of spacers 42, 42 are fixed between a flange 4a provided at one end of the main spindle 4 and a retainer nut 43 threadingly engaged with an outer circumference of the main spindle 4. The spacers 42, 40 for the inner and outer rings are not necessarily required to be provided at axially opposite ends, but maybe provided at either of the axially opposite ends.

The outer ring spacer 2 doubles as an oil supply member 12 which includes nozzles 27, 33 and a pair of oil supply channels 28 for supplying oil mist or oil air toward raceway grooves and rolling elements 10 held between the inner rings 5 and the outer rings 7 of the rolling bearings 1, 1. A reference numeral 44 denotes a pair of oil supply channels provided in the housing 6 and respectively communicating with the pair of oil supply channels 28, 28, and reference numerals 45 and 46 denote oil drainage channels respectively formed in the spacers 40 and the housing 6. Air containing a lubrication oil supplied from a pump or the like not shown is jetted into the bearings 1 from one-end portions of the inner rings 5 through the oil supply channels 44, 28 and the nozzles 27, 33, and then returned, for example, to a lubrication oil tank or the like from the other-end portions of the inner rings 5 via the oil drainage channels 45, 46.

Referring to FIG. 1, the rolling bearings 1 each include a retainer 11 for retaining the rolling elements 10 in an equidistantly spaced relation, in addition to the inner ring 5, the outer ring 7 and the plurality of rolling elements (balls) 10. The inner ring 5 is fitted around the main spindle 4 with a predetermined fitting tolerance, and the outer ring 7 is fixed to the housing 6. The rolling elements 10 are comprised of ceramic balls, which are disposed between an angular raceway groove 8 of the inner ring 5 and a raceway groove 9 of the outer ring 7. Examples of a ceramic material for the rolling elements 10 include silicon nitride, silicon carbide, titania, mullite and zirconia.

In FIG. 1, a line a extending from a contact portion 8a of the rolling element 10 and the raceway groove 8 to a contact portion 9a of the rolling element 10 and the raceway groove 9 is inclined at an angle θ with respect to a plane 51 perpendicular to a bearing center axis 50. The line a corresponds to an action line along which a force is exerted on the rolling element 10 from the inner ring 5 and the outer ring 7, and the angle θ corresponds to a contact angle. The contact angle herein means an angle formed between the plane (radial plane) 51 perpendicular to the bearing center axis 50 and the action line of a resultant of forces applied to the rolling element 10 from the rings 5, 7.

Figure 3:
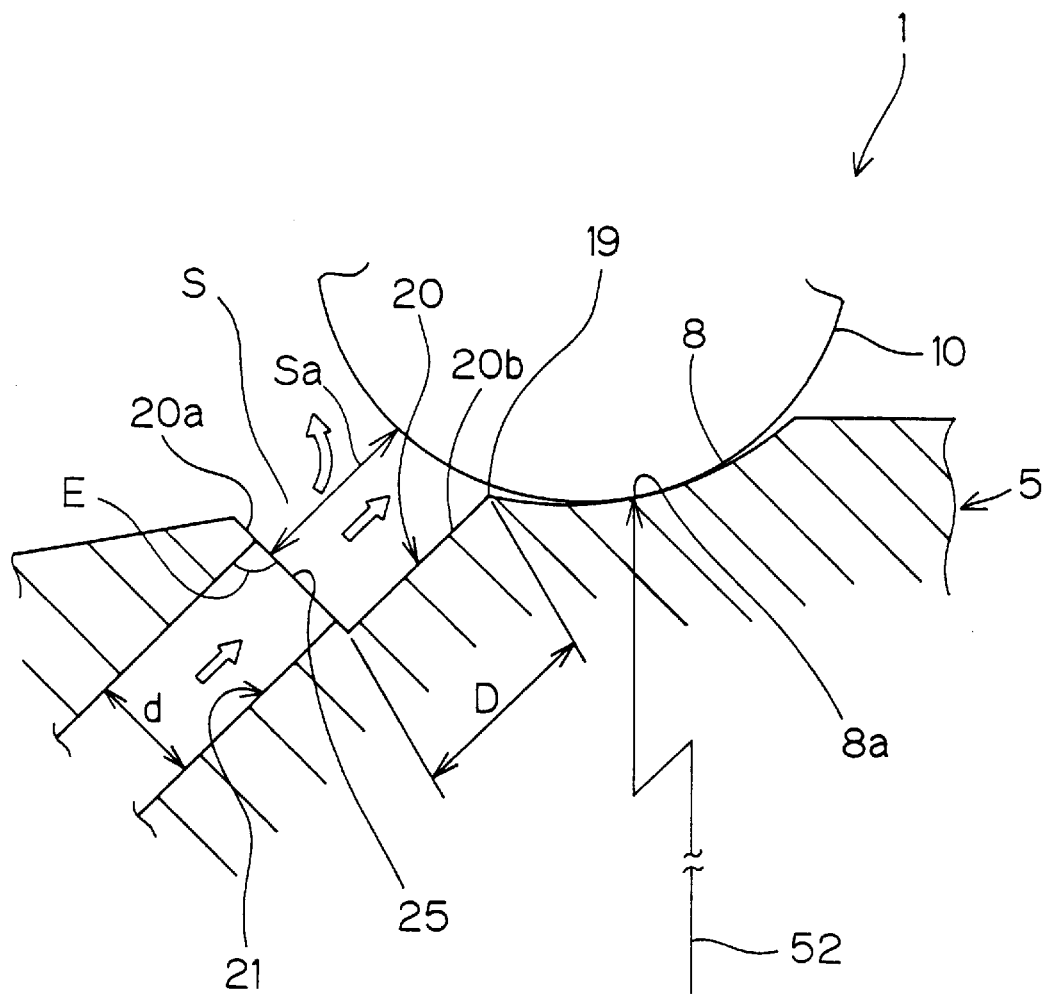
FIG. 3 is an enlarged sectional view illustrating major portions of the rolling bearing.

The inner ring 5 has a first end face 13 on a lubrication oil injection side and a second end face 31 opposite from the first end face. The first end face 13 of the inner ring 5 on the lubrication oil injection side is formed with an annular groove 14. The annular groove 14 is defined by first and second circumferential wall surfaces 15, 16 and a bottom surface 17. The circumferential wall surfaces 15, 16 are cylindrical surfaces coaxial with the axis of the inner ring 5 (i.e., the bearing center axis 50). An outer peripheral edge 22 at the bottom 18 of the annular groove 14 is located radially inwardly of the raceway groove 8 of the inner ring. More specifically, the diameter of the outer peripheral edge 22 is smaller than a raceway contact diameter 52 which is a diameter of a circle defined by the contact portions 8a of the raceway groove 8 of the inner ring as shown in FIG. 3. This arrangement makes it possible to smoothly supply the lubrication oil to the contact portions 8a of the raceway groove 8 with the aid of a centrifugal force as will be described later.

The annular groove 14 is preferably dimensioned such that the depth thereof is about one fourth to one third the width of the inner ring 5 as axially measured and the width thereof is about one fourth the thickness of the first end face 13 of the inner ring 5 as radially measured. In this embodiment, the width of the groove is about 3 mm, and the depth of the groove is about 7 mm. If the depth and width of the annular groove are greater than the aforesaid ranges, the strength of the inner ring 5 cannot be maintained. If the depth and width of the annular groove are smaller than the aforesaid ranges, the improvement of the lubrication capability cannot be expected. The bottom 18 herein means a portion including the bottom surface 17 and parts of the circumferential wall surfaces 15, 16 adjacent thereto.

The inner ring 5 has a chamfered outer peripheral edge 32 on the second end face 31, so that the area of the second end face 31 is reduced to be equated with the area of the first end face 13 formed with the annular groove 14.

Referring to FIGS. 1 and 3, the rolling bearing 1 (angular contact ball bearing) is constructed such that the rolling elements 10 contact the raceway groove 8 only at the contact portions 8a. The raceway groove 8 is offset axially to one side of the inner ring 5 (to the right side in FIG. 1). A groove 20 of a V-shaped cross section (hereinafter referred to simply as "V-groove 20") is formed in the outer circumference of the inner ring 5 along a peripheral edge 19 located on a side (the left side in FIG. 3) of the raceway groove 8 opposite from the one side. The V-groove 20 is disposed away from the contact portions 8a on the raceway groove 8 of the inner ring.

The V-groove 20 is defined by a first inclined surface 20a as a recess opposed to the rolling elements 10 and a second inclined surface 20b connected to the peripheral edge 19 of the raceway groove 8 of the inner ring. The first inclined face 20a is located apart from the opposed rolling elements 10 to define a space S which serves as a release portion for the recess.

Figure 4:
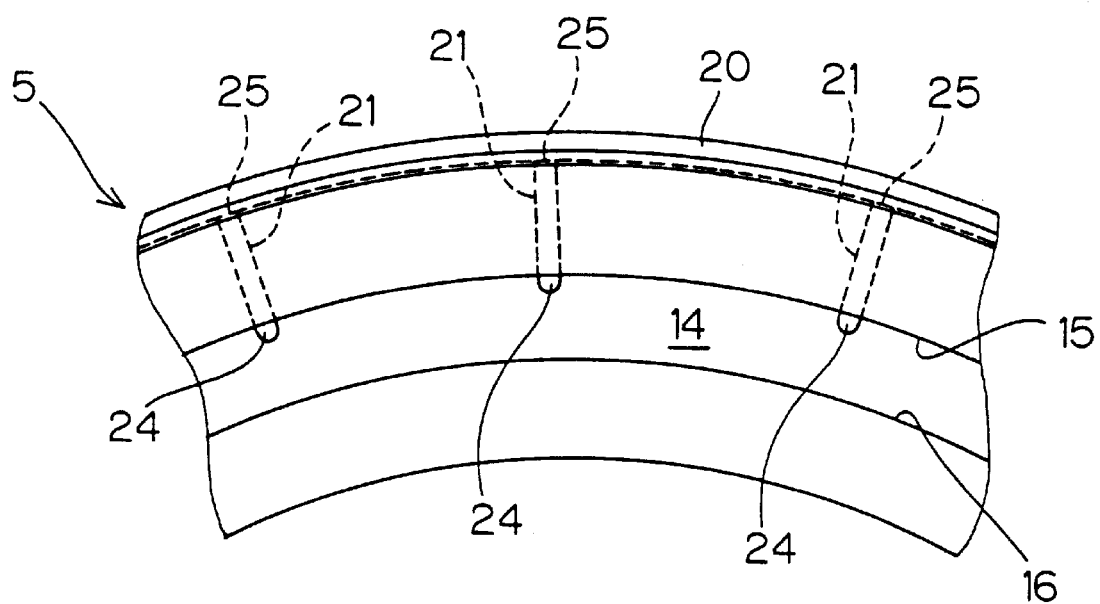
FIG. 4 is a side view illustrating major portions of an inner ring.

The first inclined surface 20a is formed with outlet ports 25 as orifices of a plurality of oil supply channels 21 for supplying the lubrication oil to the rolling elements 10 from the annular groove 14. Referring to FIG. 4, the outlet ports 25 are located equidistantly along the circumference of the inner ring 5. The oil supply channels 21 each have an inlet port 24 provided as an orifice thereof on the outer peripheral edge 22 at the bottom 18 of the annular groove 14.

Referring to FIG. 3, the oil supply channels 21 are inclined with respect to the axis of the inner ring 5 to direct toward the rolling elements 10, and extension axes of the oil supply channels 21 form an angle E of about 90 degrees (preferably 85 degrees $\leq$ E $\leq$ 95 degrees) with respect to the first inclined surface 20a.

The dimension Sa of the space S corresponds to the depth D of the V-groove 20 as measured along the second inclined surface 20b. For effective lubrication by the oil air supply method, the oil mist supply method and the oil jet supply method, the dimension Sa of the space S preferably satisfies the following relation:

$$d \leq Sa \leq 2 \cdot d$$

or $$1 \leq Sa/d \leq 2$$

wherein d is the diameter of the oil supply channels 21. Where the oil supply channels 21 each have a diameter d of 1 mm, for example, the groove depth D corresponding to the dimension of the space S is set in the range of 1 mm to 2 mm.

In reality, a portion of the inner ring formed with the V-groove 20 should have a maximum outer diameter greater than a predetermined level for prevention of disengagement of the rolling elements 10 (for provision of a so-called counterbore) and, therefore, the V-groove 20 is not allowed to have a large size. Since the first inclined surface 20a is not allowed to have a larger area, the oil supply channels preferably each have a diameter d of 0.5 mm to 2 mm. The groove depth D corresponding to the dimension Sa of the space S is preferably 0.5 mm to 4 mm.

The oil supply member 12 includes a nozzle 27 opposed to an opening 26 of the annular groove 14, and a nozzle 33 opposed to a gap defined between an inner circumference of the outer ring 7 and an outer circumference of the retainer 11, and the oil supply channel 28 connects these nozzles 27, 33 to an external oil supply source. Air containing the lubrication oil (oil mist or oil air) supplied from the nozzle 27 through the oil supply channel 28 is retained in the annular groove 14. The lubrication-oil-containing air is jetted from the nozzle 33 toward the raceway groove 9 of the outer ring 7.

Next, an explanation will be given to the lubrication of the rolling bearing unit.

The lubrication-oil-containing air jetted toward the bottom 18 into the annular groove 14 from the nozzle 27 is sprayed over the rolling elements 10 through the oil supply channels 21 opening in the bottom 18. Since the space S is defined between the outlet ports 25 of the oil supply channels 21 and the rolling elements 10 by the provision of the V-groove 20 as the release portion, sufficient air flow can stably be maintained through the space S. The sufficient air flow allows the lubrication oil contained therein to be supplied to the rolling elements 10.

The lubrication-oil-containing air, which has a mass depending on the content of the lubrication oil, receives a centrifugal force within the annular groove 14. Even if the lubrication-oil-containing air is forced outwardly toward the first circumferential wall surface 15 by the centrifugal force, no force is generated to force back the lubrication-oil-containing air toward an open peripheral edge 29 of the annular groove 14, because the first circumferential wall surface 15 is cylindrical. Since the lubrication-oil-containing air is supplied from the nozzle 27 toward the bottom 18 under pressure, the supply of the lubrication-oil-containing air toward the bottom 18 is smooth. Further, the plurality of oil supply channels 21 opening in the raceway groove 8 of the inner ring are directly connected to the bottom 18 of the annular groove 14 and, therefore, a sufficient amount of the lubrication oil can be supplied toward the raceway groove 8 of the inner ring from the annular groove 14.

The space S for release of the lubrication oil is defined between the outlet ports 25 of the oil supply channels 21 and the rolling elements 10 passing over the outlet ports 25 by the provision of the release portion in this embodiment. Therefore, the air flow can stably be maintained through the space S for the under-race lubrication employing the oil air method or the oil mist method even during the passage of the rolling elements 10. The oil mist or the oil air can be directly sprayed toward the rolling elements 10 from the outlet ports 25, thereby achieving efficient lubrication.

Since the plurality of oil supply channels 21 are utilized solely for the lubrication and the orifices 25 of the oil supply channels 21 are circumferentially equidistantly disposed, a sufficient amount of the lubrication oil can be supplied evenly over the entire raceway groove 8 of the inner ring to achieve more efficient lubrication.

The recess is provided as the release portion by forming the V-groove 20 along the raceway groove 8 circumferentially of the inner ring, so that the provision of the recess can be achieved through an easy working process. Since the oil supply channels 21 directed toward the rolling elements 10 extend generally perpendicularly to the first inclined surface 20a of the V-groove 20 opposed to the rolling elements 10, the lubrication oil can be sprayed toward the rolling elements 10 with a high directivity. Further, the generally perpendicular orientation of the oil supply channels permits easier drilling for the formation of the oil supply channels 21 in the first inclined surface 20a.

Since the opposite end faces 13, 31 of the inner ring 5 have the same area, the opposite end faces 13, 31 can simultaneously be polished with substantially the same polishing allowance. As a result, the polishing of the opposite end faces 13, 31 can be achieved by a single polishing step. In addition, this allows for easier selection of a jig to be employed for a post-working process, and obviates the need for performing the polishing process again as described above, leading to drastic improvement of the working efficiency and drastic reduction in the working time. Even if the opposite end faces 13, 31 are to be separately subjected to the polishing process, there is no need to provide additional means for applying different axial pressures to the inner ring at the polishing of the respective end faces 13, 31, and the polishing process is performed once on each of the end faces 13, 31. This also leads to improvement of the working efficiency and reduction in the working time.

Further, the inner ring 5 has a greater thickness than a conventional bearing inner ring because the annular groove 14 is formed in the first end face 13 of the inner ring 5. As a result, the PCD (pitch circle diameter) of the rolling elements is increased, so that the number of the rolling elements can be increased. This provides a secondary effect such that the load can be increased.

Figure 5:
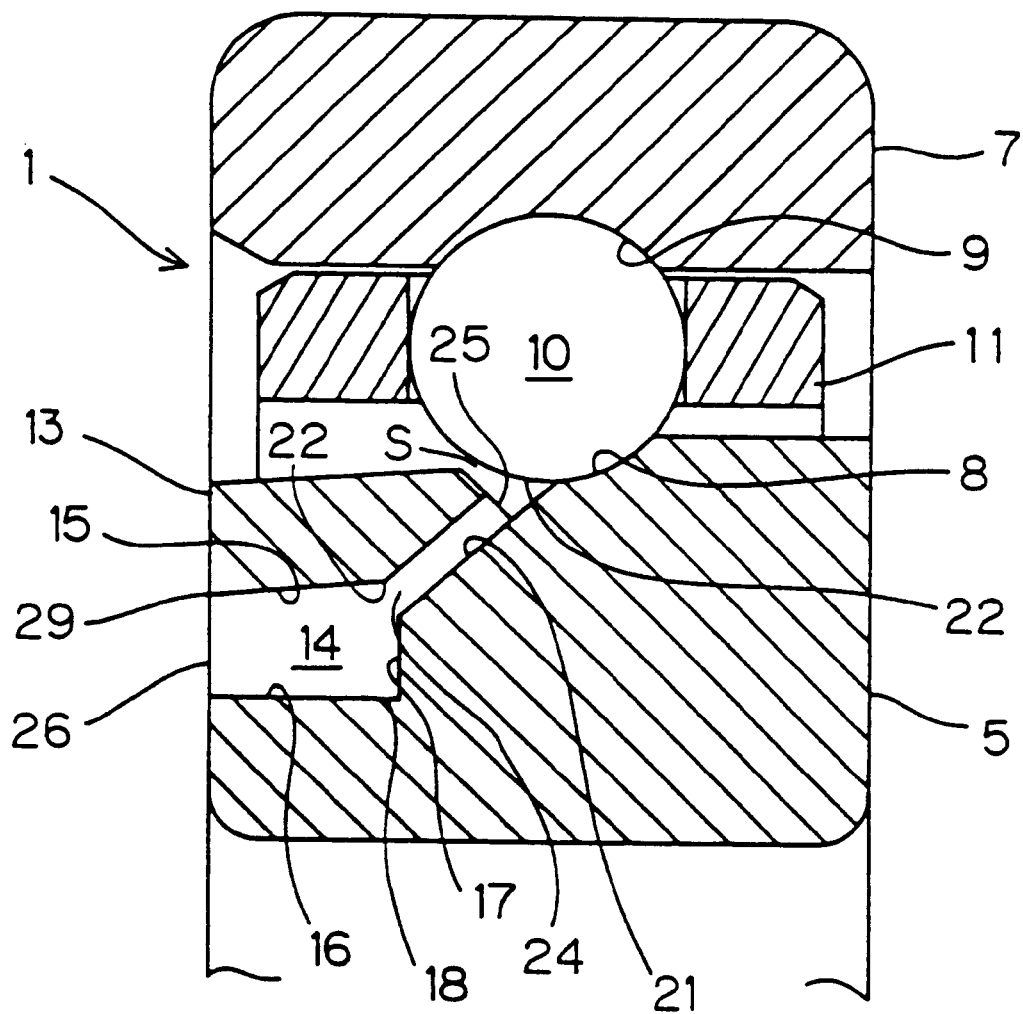
FIG. 5 is a sectional view illustrating major portions of a rolling bearing in accordance with another embodiment of the present invention.

For utilization of a centrifugal force, it is merely necessary that the diameter of the bottom edge of the first circumferential wall surface 15 is equal to or greater than the diameter of the open peripheral edge 29 of the first circumferential wall surface. In another embodiment as shown in FIG. 5, for example, the outward circumferential wall surface 15 of the annular groove 14 may be conically tapered as having a greater diameter toward the bottom 18. In this case, the centrifugal force causes the lubrication oil supplied into the annular groove 14 to reach the first circumferential wall surface 15, and then promotes the flow of the lubrication oil toward the outer peripheral edge 22 at the bottom 18 of the first circumferential wall surface 15 formed with the ports 24 of the oil supply channels 21.

In this embodiment, the same effect as in the embodiment shown in FIG. 1 is offered by providing the space S as the release portion. In addition, the centrifugal force as well as the air flow promotes the movement of the lubrication oil toward the oil supply channels 21, thereby ensuring smoother supply of the lubrication oil toward the oil supply channels 21. Further, the lubrication oil is less liable to flow out of the annular groove 14 through the opening 26.

Though not shown, the first circumferential wall surface 15 of the annular groove 14 may be defined by a smaller diameter cylindrical surface on the side of the opening 26 and a greater diameter cylindrical surface on the side of the bottom 18. In this case, the first circumferential wall surface 15 has a greater diameter at the bottom edge thereof than at the open peripheral edge 29, so that the centrifugal force promotes the flow of the lubrication oil toward the bottom 18 along the first circumferential wall surface 15 within the annular groove 14 as in the embodiments shown in FIGS. 1 and 5. This ensures smooth supply of the lubrication oil.

It should be understood that the present invention is not limited to the embodiments described above, but various changes may be made within the scope of the present invention.

What is claimed is:

1. A rolling bearing for a bearing unit which is adapted to be forcibly lubricated with a pressurized lubrication oil, the rolling bearing comprising:

a fixed outer ring;

an inner ring having first and second opposite end faces and rotatable about a center axis of the bearing;

a plurality of rolling elements interposed between the outer ring and the inner ring;

an annular groove formed in the first end face of the inner ring for retaining therein the pressurized lubricating oil; and a plurality of oil supply channels formed in the inner ring for supplying the lubrication oil toward the rolling elements from the annular groove, wherein the oil supply channels each have an inlet port communicating with the annular groove and an outlet port to be opposed to the rolling elements, wherein the outlet ports of the oil supply channels are located in a recess formed in an outer circumference of the inner ring in a circumferentially equidistantly spaced relation, wherein a space is defined between the recess and the rolling elements for releasing the lubrication oil when the rolling elements pass over the recess, wherein the outer circumference of the inner ring has a circumferential groove of a V-shaped cross section formed circumferentially thereof and defined by first and second inclined surfaces, and the first inclined surface includes the recess.

2. A rolling bearing as set forth in claim 1, wherein the first inclined surface is opposed to the rolling elements and forms an angle of 85 degrees to 95 degrees with respect to extension axes of the oil supply channels.

3. A rolling bearing as set forth in claim 1, wherein the first and second end faces of the inner ring have substantially the same area.

4. A rolling bearing as set forth in claim 1, wherein an outer peripheral edge at a bottom of the annular groove has a diameter smaller than a raceway contact diameter of the inner ring, and the inlet ports of the oil supply channels open on the outer peripheral edge at the bottom.

5. A rolling bearing as set forth in claim 4,
wherein the annular groove is defined by first and second circumferential wall surfaces opposed to each other radially of the inner ring and the bottom, wherein the first circumferential wall surface surrounds the second circumferential wall surface, circumferential wall surface is not smaller than an open edge portion of the first circumferential wall surface.

6. A rolling bearing as set forth in claim 5, wherein the first circumferential wall surface has a greater diameter toward the bottom.

7. A rolling bearing as set forth in claim 1, wherein the rolling elements each receive a force exerted thereon from the inner ring along an action line which forms a predetermined angle with respect to a plane perpendicular to the center axis of the bearing.

8. A rolling bearing as set forth in claim 7, wherein the oil supply channels each extend opposite from the action line at an angle with respect to the plane perpendicular to the center axis of the bearing.

9. A rolling bearing as set forth in claim 1, wherein the space has a dimension Sa which satisfies the following relationship:

$$1 \leq Sa/d \leq 2$$

wherein d is a diameter of the oil supply channels.

* * * * *